(12) United States Patent
Fife et al.

(10) Patent No.: US 6,601,759 B2
(45) Date of Patent: Aug. 5, 2003

(54) SYSTEM AND METHOD FOR PROVIDING FEEDBACK IN AN INTERACTIVE PAYMENT SYSTEM

(75) Inventors: John P. Fife, Scottsdale, AZ (US); Laura K. Van Winkle, Hanover, NH (US); Linda H. Birbara, New York, NY (US)

(73) Assignee: American Express Travel Related Services, New York, NY (US)

( * ) Notice: Subject to any disclaimer, the term of this patent is extended or adjusted under 35 U.S.C. 154(b) by 106 days.

(21) Appl. No.: 09/970,838

(22) Filed: Oct. 4, 2001

(65) Prior Publication Data

US 2002/0082989 A1 Jun. 27, 2002

Related U.S. Application Data

(60) Provisional application No. 60/237,851, filed on Oct. 4, 2000.

(51) Int. Cl.[7] ............................................... G06F 17/00
(52) U.S. Cl. ...................... 235/375; 235/380; 235/381; 705/41
(58) Field of Search ................................. 235/375, 380, 235/381, 492; 705/41, 71, 26, 27, 77

(56) References Cited

U.S. PATENT DOCUMENTS

| | | |
|---|---|---|
| 5,276,311 A | 1/1994 | Hennige |
| 5,578,808 A | 11/1996 | Taylor |
| 5,590,038 A | 12/1996 | Pitroda |
| 5,594,493 A | 1/1997 | Nemirofsky |
| 5,637,845 A | 6/1997 | Kolls |
| 5,661,517 A * | 8/1997 | Budow et al. ................. 725/60 |
| 5,845,263 A | 12/1998 | Camaisa et al. |
| 5,869,822 A | 2/1999 | Meadows, II et al. |
| 5,878,141 A | 3/1999 | Daly et al. |
| 5,921,865 A * | 7/1999 | Scagnelli et al. .............. 463/17 |
| 5,963,925 A | 10/1999 | Kolling et al. |
| 6,029,141 A | 2/2000 | Bezos et al. |
| 6,119,934 A | 9/2000 | Kolls |
| 6,149,055 A | 11/2000 | Gatto |
| 6,152,591 A | 11/2000 | McCall et al. |
| 6,193,152 B1 | 2/2001 | Fernando et al. |
| 6,199,051 B1 | 3/2001 | Gifford |
| 6,209,104 B1 * | 3/2001 | Jalili .......................... 713/202 |
| 6,269,348 B1 | 7/2001 | Pare, Jr. et al. |
| 6,464,146 B2 * | 10/2002 | Ito et al. ...................... 235/492 |

* cited by examiner

*Primary Examiner*—Thien M. Le
*Assistant Examiner*—Allyson Sanders
(74) *Attorney, Agent, or Firm*—Snell & Wilmer L.L.P.

(57) ABSTRACT

A system and method for presentation of feedback cues to a user of an interactive payment system is disclosed, wherein in one application, a payment product logo is displayed substantially concurrent with user entry of a payment product identifier, such as a credit card number. The subject invention further provides for the reduction of user confusion and errors with respect to entry of information related to a payment transaction. Moreover, the invention provides for reinforcement of payment product and/or service loyalty and branding.

32 Claims, 6 Drawing Sheets

FIG. 4

```
AMERICAN EXPRESS
BACK FORWARD STOP REFRESH HOME FAVORITES HISTORY SEARCH AUTOFILL LARGER SMALLER PRINT MAIL PREFERENCES
ADDRESS: http://www10.americanexpress.com/sif/cda/page0,1641,57,00.asp                Go
```

| IPAY | ADD PAYMENT OPTIONS | ABOUT IPAY | CONTACT | HELP |

STEP 3A  YOU MAY ADD TO YOUR PAYMENT OPTIONS USING ONE OF THE ALTERNATIVES LISTED BELOW. TO ENTER
A CREDIT CHARGE CARD, PROVIDE YOUR CARD INFORMATION IN ADD CARDS SECTION. YOU MAY ALSO
LINK YOUR BANK ACCOUNT TO EPAY BY FOLLOWING THE APPROPRIATE LINKS BELOW.

ADD CARDS
CARD TYPE:
AMERICAN EXPRESS ▽                          [ APPLY FOR NEW OPTION ]
ACCOUNT NUMBER: _____             [ DELETE PAY OPTIONS ]

EXPIRATION DAY (MM/YY): _____

NAME AS IT APPEARS ON CARD: _____   [ I-BROCHURE ]
                                              [ IPAY HOME ]
BILLING ADDRESS: _____              [ RETURN TO SELLER SITE ]
                                              [ MERCHANT SITES ]
CITY, STATE, ZIP: _____             [ LOG OFF IPAY ]

[ ADD THIS CARD TO MY PAYMENT OPTION ]

[ CLEAR INFO ]

ECASH

[ APPLY FOR ECASH ]   [ ABOUT ECASH ]

[ ADD OPTIONS AND GO TO IPAY HOME ]

402
404

INTERNET ZONE

FIG.5

AMERICAN EXPRESS

BACK FORWARD STOP REFRESH HOME FAVORITES HISTORY SEARCH AUTOFILL LARGER SMALLER PRINT MAIL PREFERENCES
ADDRESS: http://www.10.americanexpress.com/sif/cda/page/0,1641,5!/00.asp

IPAY HOME                                    ABOUT IPAY   CONTACT   HELP

WELCOME TO IPAY MIKE SMITH. DOWNTOWN FLOWERS YOUR PURCHASE FROM SELL.COM IN THE AMOUNT OF 1,000 DOLLARS WILL BE PROCESSED BY IPAY USING THE PAYMENT METHOD YOU CHOOSE. ONCE YOU HAVE CONFIRMED YOUR DESIRED PAYMENT METHOD, JUST CLICK ON THE COMPLETE THIS TRANSACTION BAR BELOW.

△ CURRENT TRANSACTION DATA

PURCHASER: MIKE SMITH
SELLER: SELLER.COM
AMOUNT: $1000
IPAY TRANSACTION NO.: 123456

△ EXISTING PAYMENT OPTIONS (CHOOSE ONE)

⦿ DELTA SKYMILES
  CARD ACCOUNT NUMBER: XXXX XXXX XXXX 1234
○ EXECUTIVE CORPORATE CARD
  CARD ACCOUNT NUMBER: XXXX XXXX XXXX 1234
○ CORPORATE EXECUTIVE GOLD
  CARD ACCOUNT NUMBER: XXXX XXXX XXXX 1234
○ CORPORATE OPTIMA PLATINUM
  CARD ACCOUNT NUMBER: XXXX XXXX XXXX 1234

COMPLETE THIS TRANSACTION  ⎤ 502

ADD PAY OPTIONS
DELETE PAY OPTIONS
VIEW OPTION DETAILS

I-BROCHURE
IPAY HOME
RETURN TO SELLER SITE
MERCHANT SITES
LOG OFF IPAY

INTERNET ZONE

SYSTEM AND METHOD FOR PROVIDING FEEDBACK IN AN INTERACTIVE PAYMENT SYSTEM

RELATED APPLICATIONS

The present application claims the benefit of, and priority to, U.S. Provisional Application No. 60/237,851 filed Oct. 4, 2000; the entire content of which is hereby incorporated by reference.

FIELD OF INVENTION

This invention generally relates to a system for utilizing user feedback cues in an interactive payment system. More specifically, the invention relates to the use of visual feedback to reduce customer confusion and errors in a transaction while reinforcing payment product and/or service branding.

BACKGROUND OF THE INVENTION

Interactive payment systems have been employed in a variety of customer settings. For example, U.S. Pat. No. 6,152,591 discloses a fuel dispensing system having a graphics user interface that allows the customer to interact with instructions or commercial advertisements displayed on a multimedia device. The system includes a touch screen display interface, a fuel dispenser and a multimedia controller that operate to determine if the customer has used the fuel dispenser before, and if not, to display additional instructions to assist the customer with the operation of the fuel dispenser. U.S. Pat. No. 5,845,263, on the other hand, describes a visual ordering system that uses images to allow a restaurant customer to order menu items from an interactive display. As the customer decides which menu items to order, the system tabulates a running bill and provides an payment interface to permit the customer to tender payment for the ordered items. U.S. Pat. No. 5,878,141 to Microsoft describes an interactive system and method for determining the overlap between a set of payment options that are available to a purchaser and a set of payment options accepted by a merchant in order to compute an intersection of the sets to provide the purchaser with a list of only those payment options accepted by the merchant which the purchaser is capable of using to consummate the transaction. Additionally, many examples may be found on the Internet where an electronic shopping system is deployed to permit a customer, for example: (1) to select items for purchase from an online catalog; and (2) to tender payment via, for example, a webpage interface.

Pre-existing systems, however, are generally configured to prompt customers to enter a payment product I service identifier (i.e., a credit card number, account code, and/or the like) as a string of alphanumeric characters which is usually processed near the conclusion of the transaction—often concurrent with charge authorization. During this process, the customer is generally left with relatively few resources for determining which mechanism of payment was utilized to initiate the payment process until, for example: (1) verification of the charge authorization fails; or (2) a receipt for the completed purchase has been generated.

There is a need, therefore, within the interactive payment processing and multimedia arts, to provide substantially immediate customer feedback that is, at least in part, based on data obtained from the customer's selection of a method for tendering payment for a transaction. There is also a need for a feedback system and method that reinforces payment product and/or service branding for payment product marks, such as, for example: AMERICAN EXPRESS®; AMERICAN EXPRESS OPTIMA®; BLUE FROM AMERICAN EXPRESS®; Mastercard®; Visa®; etc.

SUMMARY OF THE INVENTION

In general, the present invention discloses an improved system and method for providing feedback in an interactive payment system. Presenting feedback in an interactive payment system helps customers inter alia understand transaction data they have entered and provides cues for identifying, for example, potentially incorrect data prior to payment processing. Presentation of feedback also helps payment product and/or service providers increase recognition of a particular product, service or overall brand.

In one representative application, a visual display cue indicates a payment product type based on an alphanumeric sequence that identifies a payment product, such as a customer credit card. The system is initialized with a set of display cues and associated criteria that trigger display cues at system initialization or on an ongoing basis as various information is loaded, stored and/or processed. For example, at system initialization the icon for an AMERICAN EXPRESS® customer card can be associated with a criterion or set of criteria that trigger the display of an appropriate icon.

As the customer enters a credit card number, an algorithm processes the digit sequence entered to determine the payment method. For example, the system may parse the payment identifier the customer entered to detect a BIN number, which, for example, may be the first six digits of the credit card number. The BIN number generally provides broad information about the payment product/service, such as payment routing information. This information can be used to determine the identity of the company providing the payment product/service, as well as other information unique to the customer or account.

Additional digits may be used to determine other information, such as: the particular payment product/service type; whether the card belongs to a particular group (i.e., credit union members, senior citizens, etc.); or the country or locale where the card was issued. For example, the customer may have entered an AMERICAN EXPRESS® customer card account number that was issued to a senior citizen in the United States. The processing for these features may be encoded into a look up table or alternatively may be algorithmically derived. In a table encoding scheme, the digits of the card may be used to index a table containing payment product/service features and attributes. In an algorithmic processing scheme, the digits may be processed to determine the product/service features and attributes. For example, if the seventh digit is an odd number, or alternately if the sum of the seventh, eighth and ninth digits are odd, this may indicate a specific card product, such as that of a senior card.

The BIN and digit processing may be accomplished on a customer system or on a remote host server. In a customer-based processing system, instruction code for determining the payment instrument type may reside on a local computer used by the customer. For example, the instruction code may be adapted as a Java® program that is run on the local browsing computer, which may be configured to determine the payment instrument type and display an appropriate visual cue. Alternatively, in a server-based processing system, the payment instrument identifier may be transmitted to, for example, a payment processing server computer where the payment identifier is processed and the appropriate code information, or the appropriate display cue, may be returned to the customer for visual display. The customer-based embodiment has the potential advantages of speed and flexibility, while the remote processing embodiment may provide additional security and display cue flexibility. The remote processing scenario may be integrated with, for example, payment instrument validation as well. The display cue may further provide information about the validation process, such as card declination or acceptance status, available balance information, etc.

Once the type of payment system has been identified, the appropriate graphical display cues may then be selected and displayed. Similar to the processing above, the display process may be local (e.g., customer-side) or remote (e.g., server-side). In a customer-based approach, the display cue may be processed and displayed from a local store of display cues. In the server-based approach, the display cue may be selected from a remote database of feedback cues and either transmitted independently to the customer or incorporated into a webpage or other suitably adapted data presentation that is then provided to the customer.

The present invention thus provides for substantially immediate customer feedback based on data obtained from the customer's selection of the method, service or payment product for consummating a transaction. Moreover, the disclosed method also provides for the reduction of customer confusion and errors in a transaction while reinforcing payment product and/or service branding. Additional advantages of the present invention will be set forth in the detailed description which follows, and in part will be obvious from the detailed description, or may be learned by practice of the invention.

BRIEF DESCRIPTION OF THE DRAWINGS

The above and other features and advantages of the present invention are hereinafter described in the following detailed description of illustrative embodiments to be read in conjunction with the accompanying drawings and figures, wherein like reference numerals are used to identify the same or similar system parts and/or method steps in the similar views, and:

FIG. 4 is a sample screenshot depicting an exemplary interface for entering credit card information according to still another embodiment of the present invention;

FIG. 5 is a sample screenshot depicting an exemplary payment product visual cue, displayed for transactional purposes, according to a further embodiment of the present invention.

Figure 1:
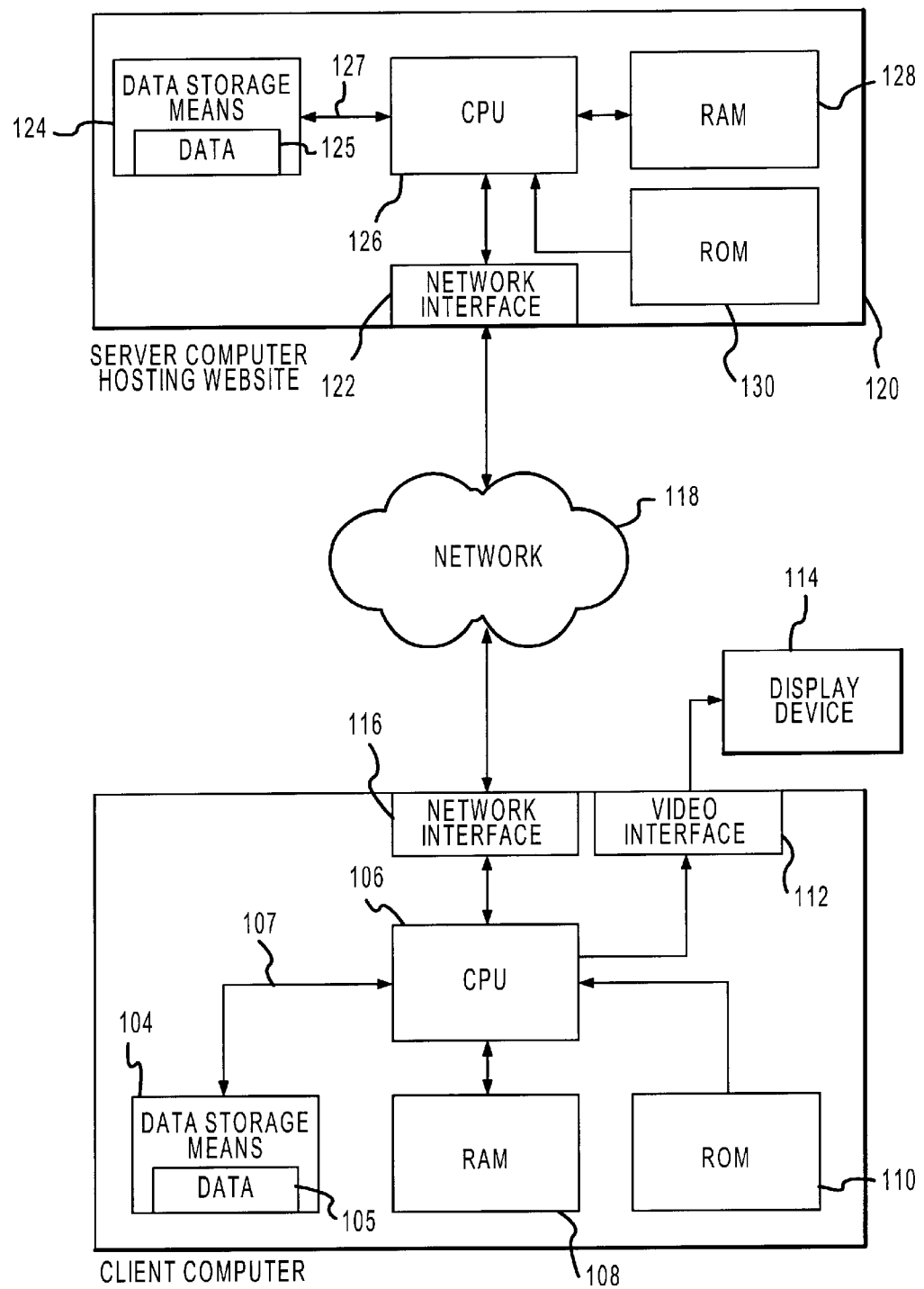
FIG. 1 is a block diagram of an exemplary interactive payment system display in accordance with one embodiment of the present invention.

Other aspects and features of the present invention will be more fully apparent from the detailed description that follows.

DETAILED DESCRIPTION OF EXEMPLARY EMBODIMENTS

The following descriptions are of exemplary embodiments of the invention, and are not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention. Various exemplary implementations of the present invention may be applied to any interactive system such as, for example: a multimedia ordering interface for the purchase of goods and/or services from an online catalog; a system for managing balance transfers between accounts; and/or a system for managing loyalty reward redemption/transfer. As used herein, the terms "feedback" and "cue", or any variation or derivative thereof, includes anything that is currently susceptible to being characterized as capable of providing at least a: (1) literal (e.g., unitary), (2) referential (e.g., non-unitary) or (3) iconic (e.g., abstract) representation or indicia corresponding to user entered data—or anything that may hereafter be similarly so characterized. By way of example, a detailed description of an exemplary application, namely the presentation of visual feedback associated with payment for the purchase of items from a web-based online store, is provided as a specific enabling disclosure that may be generalized by those skilled in the art to any application of the disclosed system and method for providing feedback in accordance with the present invention.

The subject invention relates to the use of feedback cues in an interactive payment system. One exemplary embodiment set forth herein relates to a visual feedback system and method for: (1) reducing customer confusion and errors associated with a payment transaction; and (2) reinforcing payment product and/or service branding. It will be appreciated, however, by one skilled in the art that the principles of the present invention may be employed to ascertain and/or realize any number of other benefits associated with feedback in an interactive payment system such as, for example, correlating eligibility for targeted service offers.

In an exemplary embodiment, a merchant computer and a bank computer are interconnected via a network, referred to as a payment network. The payment network represents existing proprietary networks that presently accommodate transactions for credit cards, debit cards, other types of financial/banking cards and the like. In one embodiment, the payment network is a closed network that may be assumed to be secure from eavesdroppers. Representative examples of a suitably adapted payment network include inter alia the American Express®, VisaNet® and the Veriphone® networks.

The electronic commerce system may be implemented, for example, at the customer and issuing bank. In an exemplary application, the electronic commerce system is implemented as computer software modules loaded onto the customer computer and the banking computing center. The merchant computer need not necessarily require any additional software to participate in the online commerce transactions supported by the online commerce system.

An "account number", as used herein, includes any device, code, or other identifier and/or indicia suitably configured to allow the consumer to interact or communicate with the system, such as, for example, authorization/access code, personal identification number (PIN), Internet code, other identification code, and/or the like which is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency and/or optical device capable of transmitting or downloading data from itself to at least a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number pattern "0000 0000 0000 0000". In one exemplary embodiment, the first five to seven digits are reserved for processing purposes and identify the issuing bank, card type, etc. In one example, the sixteenth digit may be used as a checksum for the sixteen-digit number and the intermediary eight-to-ten digits may be used, for example, to uniquely identify the customer.

In one exemplary embodiment of the present invention, customers use a customer computing device 102 that is configured to connect with and purchase goods and/or services from websites on the Internet as shown, for example, in FIG. 1. In one embodiment, customer computing device 102 may be configured to comprise, for example, a general purpose microprocessor (i.e., a central processing unit, hereafter "CPU") 106 which is communicably coupled to RAM 108 and ROM 110 memory. Computing device 102 may alternatively or conjunctively comprise, for example: a Bluetooth appliance; a wireless phone, a PDA, a smartcard, a smartcard reader, an RFID transponder, an RFID transponder reader and/or any other suitably adapted data processor configuration now known or hereafter derived by those skilled in the art.

The Bluetooth wireless standard allows users inter alia to make wireless connections between various communication devices, such as, for example, mobile phones, desktop computers and notebook computers. In one exemplary application, the Bluetooth protocol uses radio transmissions to transfer both voice and data in real-time with various provisions to minimize communications interference and to preserve datastream security. In one exemplary embodiment, Bluetooth technology supports point-to-point and point-to-multipoint wireless connections. The current industry specification for Bluetooth supports up to seven slave devices that may be configured to communicate with a master radio in one device. Several such "piconets" may be established and linked together in what are termed "ad hoc scatternets" to permit inter alia communication among various configurations. Devices found in the same piconet have priority synchronization while other devices may be configured to enter at any time. The topology is frequently described as a "flexible, multiple piconet structure". For a general discussion and introduction to the Bluetooth wireless standard, please see "Specification of the Bluetooth System version 1.1", various authors, ©2001 Bluetooth SGI, Inc. (available at http://www.bluetooth.com), incorporated herein by reference.

Customer computing device 102 further comprises data storage means 104 containing, in one exemplary embodiment, data 105 to visually depict, for example, an icon corresponding to a financial instrument used by the customer (e.g., customer) to tender payment for a purchase. Data storage means 104 may be any hardware and/or software suitably adapted to store data 105, such as, for example: an LDAP database; a relational database; a flat-file; an SQL-compliant database; an XML cache and/or the like. In one exemplary embodiment, data storage means 104 comprises a database; however, in alternative exemplary embodiments, data storage means 104 may comprise any means adapted for the temporary or persistent storage of data now known or hereafter derived by those skilled in the art.

In one exemplary embodiment in accordance with the present invention, customer computing device 102 additionally comprises a network interface 116 to allow the transfer of data across a network communications path 118. One skilled in the art will appreciate that such a network communications path 118 may include any system for exchanging data, such as, for example: the Internet; an intranet; an extranet; WAN; LAN; wireless communications network and/or the like. It is noted that the network 118 may also be implemented as other types of networks, such as an interactive television (ITV) network. Exemplary network data traffic protocols may include, for example: TCP/IP; IPX/SPX; Bluetooth; Appletalk; IP-6; NetBIOS; OSI or any existing or future data traffic protocols now known or hereafter derived by those skilled in the art.

In still a further exemplary embodiment, customer computing device 102 further comprises a display device 114 coupled to a video interface 112 to display an icon, for example, of a financial instrument used to tender payment for a customer purchase. Additionally, the customer may interact with the customer computing device 102 using any number of I/O means, such as, for example: a monitor; a keyboard; a keypad; a mouse; a stylus; a lightpen; a digitizing tablet; a touch screen; speech recognition; infrared; radio wave; and/or any other I/O method now known or hereafter derived by those skilled in the art. In various exemplary embodiments of the present invention; the customer may interact with the customer computing device 102 via user interface means comprising any combination of: HTTP; HTTPS; HTML; XML; DHTML; ASP; CGI; a Windows® application; an X-Windows® application; Activex®; Visual Basic Script®; Javascript®; Perl®; a telnet session; an ftp session; a gopher session; a command line interface; a text-based interface; a graphic user interface or any user interface now known or hereafter derived by those skilled in the art.

In another exemplary embodiment, the processing of the financial instrument and determination of the proper icon to display to the user (e.g., customer) may be performed by a server computer 120. Server computer 120 may be configured to comprise a network interface 122 to receive customer data from over the network 118. In one application in accordance with the present invention, data passes over the network 118 from the customer computing device 102 to the server system CPU 126. In an exemplary embodiment, server system processor 126 is communicably connected to RAM 128 and ROM 130 memory. Server system data storage means 124 contains data 125 that may be configured to correspond, for example, to credit card data entered by a customer which, in one embodiment, may be correlated with an appropriate icon for the financial instrument used by the customer to consummate the transaction.

In addition to providing an appropriate icon for display to the customer, server computer 120 may be optionally configured to access a customer's extended credit information, for example, by accessing the credit provider's database by any means now known or hereafter derived in the art. This information allows the server to communicate information, such as, for example, the APR for the card, the expiration date, etc. Extended customer credit information, in accordance with one exemplary embodiment of the present invention, may be used to provide specialized icons to indicate to the user, for example, higher or lower interest rates on particular cards, approaching expiration dates, etc.

Additional components, such as, for example, Access, SQL Server, Oracle, MySQL, Interbase, etc., may be used in either the customer system 102 or the server system 120 to provide, a suitably adapted database management system. In a representative aspect, in accordance with an exemplary embodiment of the present invention, data storage means 104, 124 may be any type of database, such as relational, hierarchical, object-oriented, flat-file and/or the like. Common database products that may be used to implement such a database may include, for example, DB2 by IBM® (White Plains, N.Y.), any of the database products available from Oracle® Corporation (Redwood Shores, Calif.), Microsoft Access® by Mircrosoft® Corporation (Redmond, Wash.), or any other database product now known or hereafter derived by those skilled in the art. Data 105, 125 may be organized in any suitable manner, including, for example, data tables, look-up tables or any matchable data structures now known or hereafter derived by those skilled in the art.

Association of certain data 105, 125 may be accomplished through any data association technique known and practiced in the art. For example, the association may be accomplished either manually or automatically. Automatic association techniques may include, for example, a database search, a database merge, GREP, AGREP, SQL and/or the like. The association step may be accomplished by a database merge function, for example, using a "key field"; where said key field, for example, partitions the data 105, 125 stored in data storage means 104, 124 according to a high-level class of objects defined by the key field. For example, a certain class may be designated as a key field in both a first data table and a second data table, and the two data tables may then be merged on the basis of the class data in the key field. In one embodiment, data corresponding to a key field in each of at least two merged data tables is preferably the same. However, data tables having similar, though not identical, data in the key fields may also be merged by using AGREP, for example.

Figure 2:
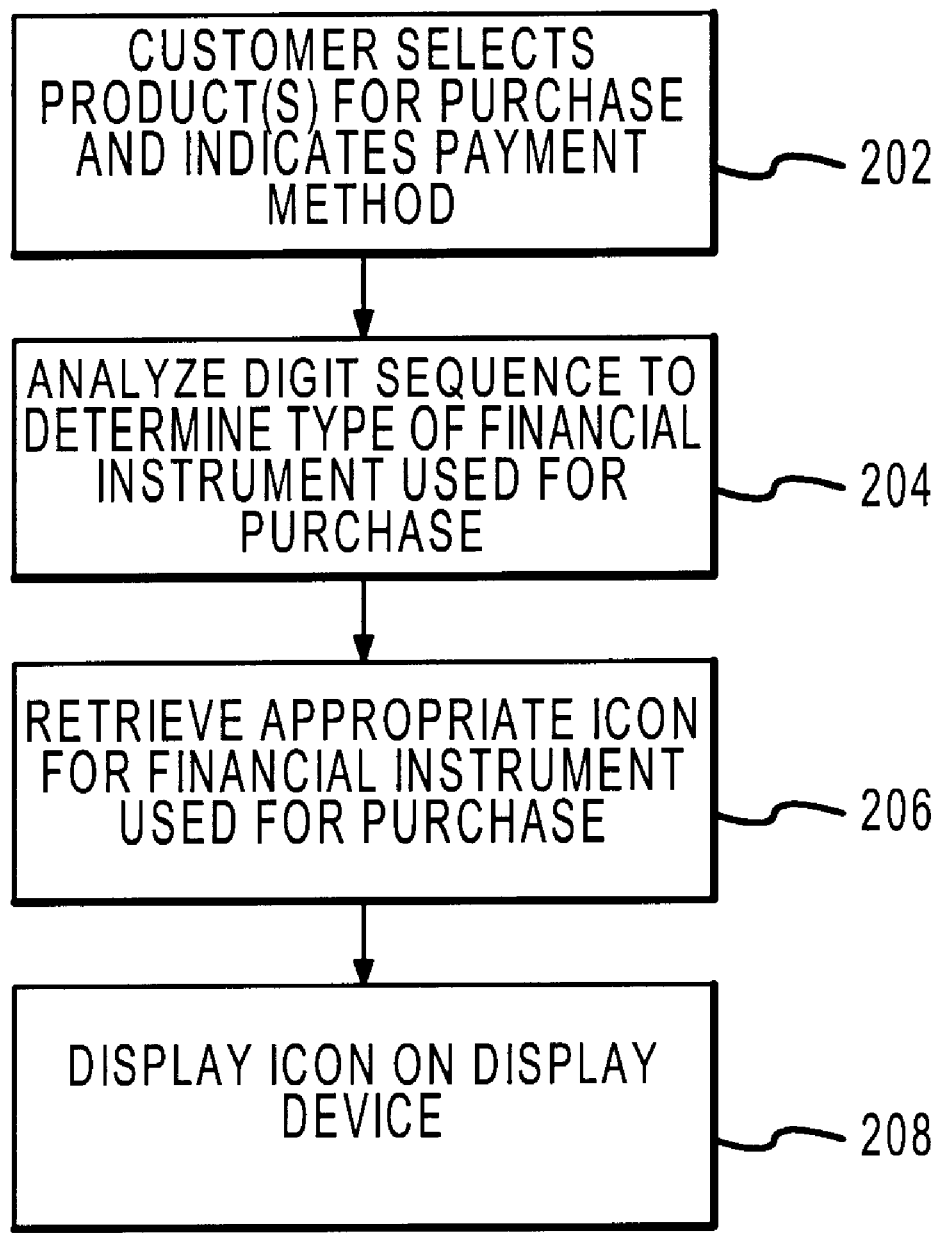
FIG. 2 is a flowchart of an exemplary visual display processing method in accordance with another embodiment of the present invention.

In one exemplary application, customers use their customer computing devices to suitably connect to various e-commerce sites on the Internet as shown, for example, in FIG. 2. After the customer has browsed the selections of products and/or services offered by a merchant, the customer will indicate one or more items to purchase (step 202) and provide, for example, a credit or charge card for payment. In one exemplary embodiment, software residing on the customer computer will accept the account number and use it as an input parameter to a function that will return the card type (step 204). Algorithms for deducing the card type from the account number on the card are well known to those skilled in the art. Various other information may be derived from analysis of an account number, such as, for example: account validity; billing cycle date; various fraud detection data and such other information now known or hereafter derived by those skilled in the art.

Data storage means 104, 124 may be configured to contain a plurality of icons, each representing an individual credit or charge card; additional card icons may also be downloaded from other host servers (not depicted) that may be operated by banks or other financial institutions. In one exemplary embodiment, in accordance with the present invention, the software uses the card type returned by the analysis function to retrieve the appropriate card icon (step 206). The card icon may then be displayed on the display device 114 in, for example, the proximity of the customer account data (step 208) as it is being entered. For example, after and/or concurrent with the entry of card account data, an icon will appear next to the account number.

Figure 3:
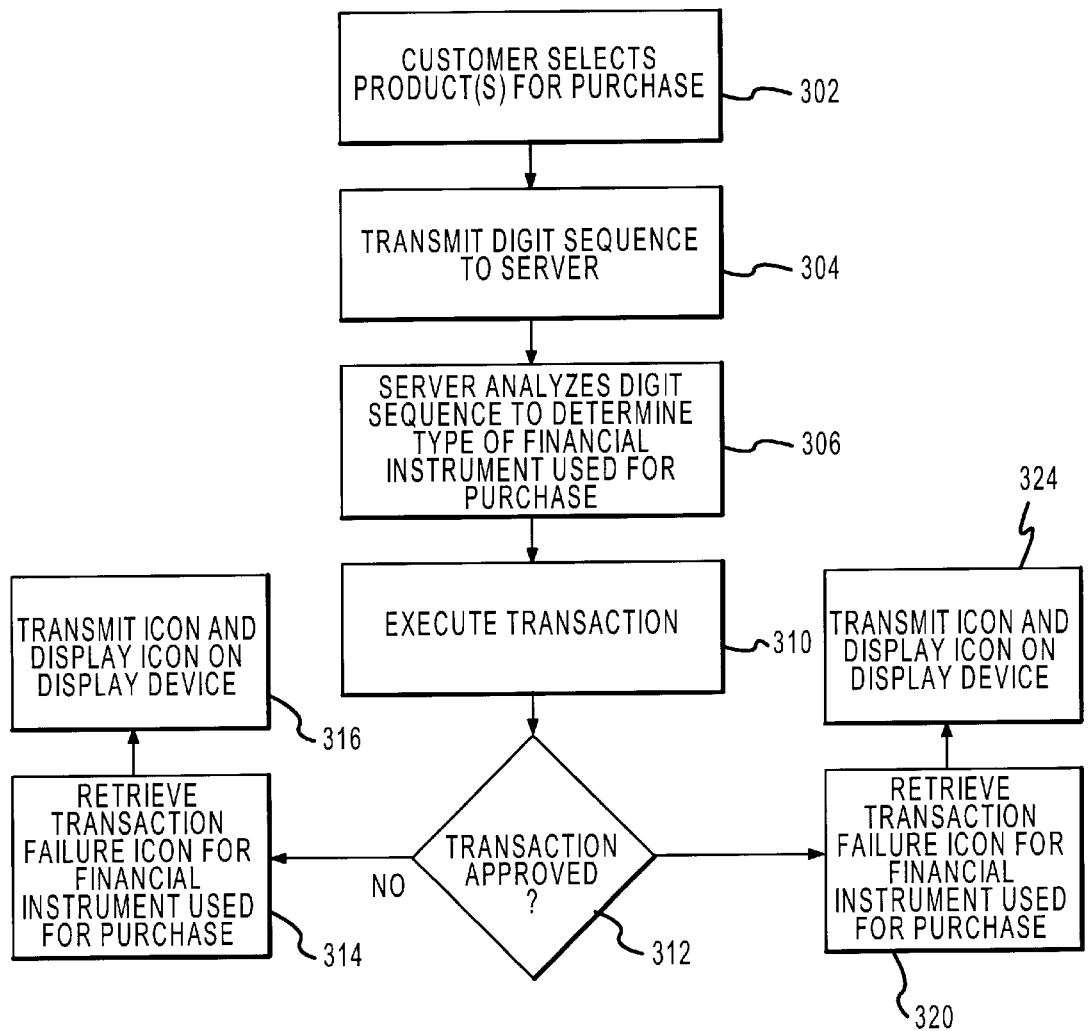
FIG. 3 is a flowchart of an exemplary visual display processing method in accordance with yet another embodiment of the present invention.

In another exemplary embodiment of the present invention, as depicted for example in FIG. 3, a customer selects a product that they desire to purchase and supply credit or charge card information for payment (step 302). The account digit sequence is then transmitted across a network 118 to a server 120, for example, operated by a merchant (step 304). Software may be configured to use the entered account data as an input parameter to a function that returns, for example, the card type (step 306). In one exemplary embodiment of the present invention, the software may be hosted on a server system 120, thereby providing for inter alia rapid and efficient modification of centralized code. In an alternative exemplary embodiment, the software may be located on a client computing system 102, thereby providing for improved time-to-market as well as inter alia customization and flexibility of the instruction code.

In one exemplary application of the present invention, the merchant processes a transaction (step 310) and receives a response from a bank or other financial institution. If the transaction is approved (step 312), the server software, for example, retrieves the appropriate icon for the financial instrument used to make the purchase. The icon may then be transmitted to the customer computing device 102 and displayed on the display device 114 in the proximity of, for example, the card data (step 322). If, on the other hand, the transaction is declined (step 312), the server software may be configured to retrieve an appropriate transaction failure icon for the financial instrument used to make the purchase (step 314). The icon may then be transmitted to the customer computing device 102 and displayed on the display device 114 in the proximity of, for example, the card data (step 316).

FIG. 4 presents an exemplary screenshot depiction of controls configured to allow a user to enter information related to credit and/or charge cards that are stored and made available when the customer wishes to tender payment for purchasing an item. Customers enter card data, for example, into a plurality of text entry boxes 402 and submit the data by activating, for example, an "add cards" button 404. In an exemplary embodiment of the present invention, after card data has been supplied, the system retrieves the appropriate icon for the card data supplied by the customer. The icon may then be displayed in the proximity of the card data 502 thereby providing the user with substantially immediate visual feedback as to the card associated with each account.

In addition to using the present system and method to present visualizations of credit, charge, debit and/or smart-cards used in the execution of transactions (e.g., purchases of goods and services), the present invention may also be adapted to visualizations within a customer's profile. Many websites allow customers to set up accounts that contain, for example, personal information such as: shipping addresses; billing addresses; credit, charge, and smart card information and/or the like. When customers view their profiles, card data may typically be presented with an account number and text to identify the card.

Figure 6:
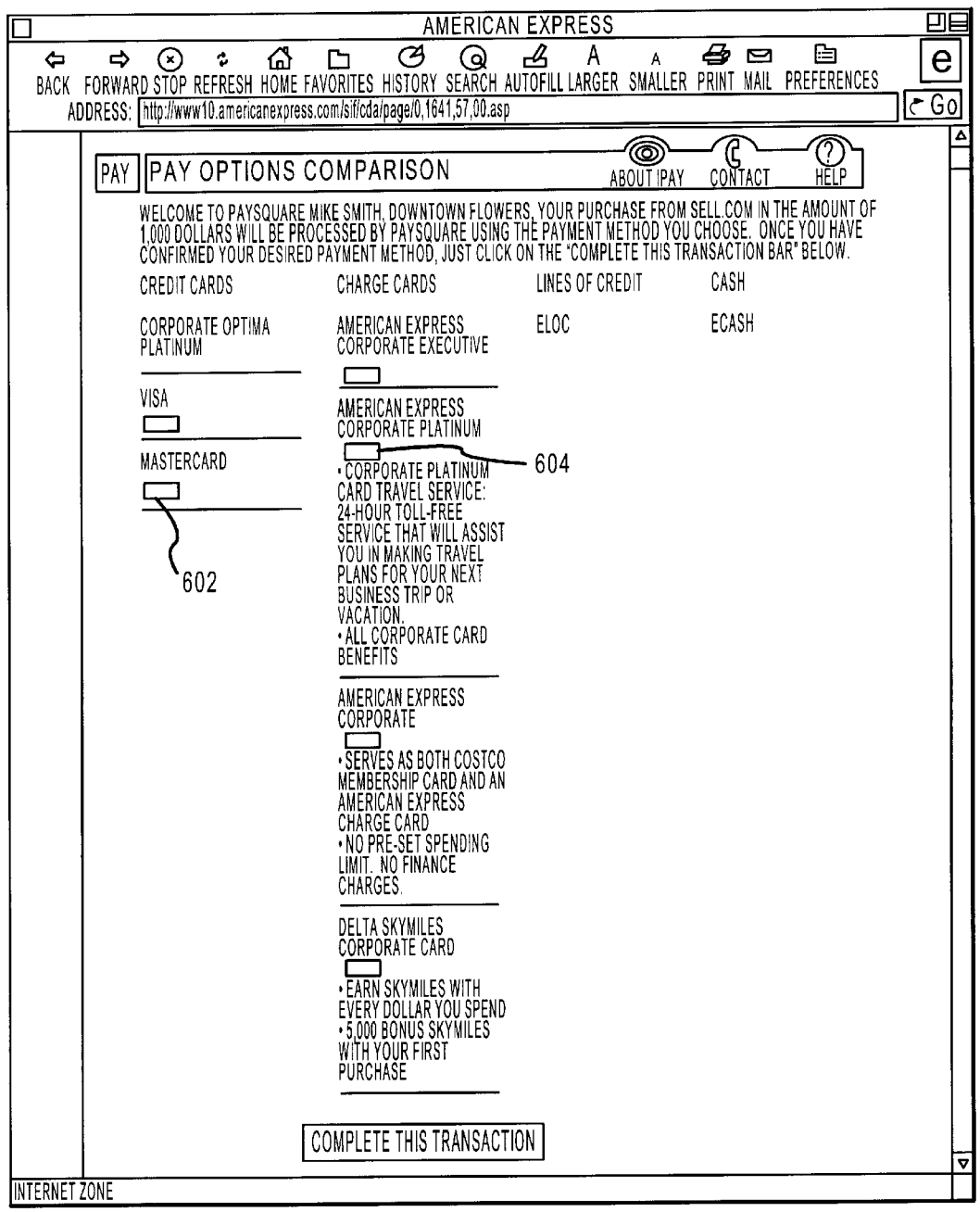
FIG. 6 is a sample screenshot depicting an exemplary user profile interface in accordance with yet a further embodiment of the present invention.

FIG. 6 presents an exemplary screenshot depiction of a sample customer profile. At the time a customer profile is created, the customer supplies the system with inter alia credit card account information, charge card account information and/or the like. Using the methods previously described, a separate visual cue can be generated for each supplied payment product and stored, for example, with the user's profile. When a customer's profile is accessed, icons for each credit 602 and charge card 604, for example, may then be displayed for the customer to select from. By providing customers with a visual cue to identify each card, confusion is eliminated, or otherwise dramatically reduced, and brand loyalty and recognition is reinforced.

In one exemplary application, the customer and/or server system may be initialized with a set of feedback display cues and associated criteria that trigger display of the cues at system initialization and/or on an ongoing basis as customer information is loaded, stored and/or processed. For example, at server system 120 initialization, an icon for an AMERICAN EXPRESS® customer card may be stored in the data store 125 of a server computer 120 and associated with a criterion or set of criteria that trigger the display of an appropriate icon on the customer computer display device 114. Alternatively or conjunctively, at customer system 102 initialization, for example, an icon for an AMERICAN EXPRESS® customer card may be stored in the data store 105 of customer computing device 102 and associated with a criterion or set of criteria stored remotely in the data store 125 of the server computer 120 that trigger the display of an appropriate icon on the customer display device 114. It will be readily apparent to those skilled in the art that various other permutations of storage of cue data and processing of trigger criteria may also be employed and the same shall be properly regarded as within the scope of the present invention.

As the customer enters, for example, a credit card number, a software and/or hardware algorithm may be adapted to analyze the digit sequence entered to determine the payment method. For example, either the customer processor 106 or the server processor 126 may be configured to parse or otherwise process the payment identifier entered by a customer, for example, to detect a BIN number. The BIN number generally provides broad information about the payment product/service, such as payment routing information, payment service processing, etc. This information can be used to determine, for example, the company that provides the payment product/service, as well as other information unique to the customer and/or the account. It will be appreciated by those skilled in the art that various other payment product/service account and/or customer information may be used to trigger the processing of customer-entered data to provide substantially immediate display of visual feedback cues to the customer.

In one exemplary embodiment of the present invention, various biometric information may be obtained from the customer which may thereafter be correlated with a customer's account number. Such biometric data may include, for example: facial recognition; ear curvature recognition; retinal imaging; sub-dermal transponder identification; fingerprint recognition; motor pattern/gait recognition; various morphological ratios; EEG data; EKG data; DNA data; RNA data; blood type data; various biochemical marker data; protein expression data and/or any method of unique biological identification now known or hereafter derived by those skilled in the art of biometrics. For a general discussion of biometrics, please see U.S. Pat. No. 5,787,186 issued to Schroeder on Jul. 28, 1998, the disclosure of which is incorporated herein by reference.

In another exemplary embodiment in accordance with the present invention, additional account number digits may be used to determine various other information, such as: the payment product/service type; whether the card belongs to a particular group (i.e., credit union members, club members, federal employees, senior citizens, etc.); the locale where the card may have been issued; loyalty reward points; fixed APR's and/or promotional lending rates. For example, the customer may have entered an AMERICAN EXPRESS OPTIMA® card account number that was issued to a senior citizen in the United States. In one exemplary embodiment, a look-up table encoding scheme may be used, wherein the digits of a customer card account number may be used to index a table containing payment product/service data. In an alternative exemplary embodiment of the present invention, an algorithmic processing scheme may be employed, wherein, for example, the account number digits may be processed to determine product/service features and attributes. For example, if the seventh digit is an odd number, or alternately if the sum of the seventh, eighth and ninth digits are odd, this may indicate a specific card product, such as that of a United States issued senior citizen's card.

The BIN and digit processing may be accomplished on the customer system 102 or on a remotely located server system 120. In a customer-based processing system, instruction code for determining the payment instrument type may reside on a local computing device 102 used by the customer. For example, the instruction code may be adapted as a Java® program that may be executed as an instance of a local web-browsing application, which may be configured, for example, to determine the payment instrument type and to display a corresponding feedback cue. One of the representative benefits of using Java® is inter alia the ability to generate platform independent code without the need for compiling the program for various instruction sets and/or processor architectures. For a further discussion of the Java® programming language, please see Nicholas Kassem, "Designing Enterprise Applications with the Java™ 2 Platform, Enterprise Edition", Addison Wesley ©2000 Sun Microsystems, Inc., hereby incorporated by reference. Alternatively, in a server-based processing system, the payment instrument identifier may be transmitted, for example, to a payment processing server computer 120 where the payment identifier is processed and the appropriate account code information, or the appropriate display cue, may be returned to the customer for subsequent display.

The customer-based processing scheme has the advantages of inter alia speed and flexibility of processing execution, while the remote processing scheme may provide inter alia additional security and display cue customization. In one exemplary embodiment of the present invention, the remote processing scenario may also be integrated with, for example, payment instrument validation. In yet a further exemplary embodiment, the cue may additionally provide information about the validation process, such as: card declination/acceptance status; available balance information; loyalty points; merchant purchase capabilities and/or eligibility for promotions based on product type, etc.

Once the type of payment product and/or service has been identified, an appropriate graphical display cue may then be selected to provide visual feedback to the customer, for example, to assist the customer in recognizing the payment product/service being employed to execute the transaction. As previously disclosed, the display process may be local (e.g., customer-side) or remote (e.g., server-side). In a customer-based approach, the display cue may be processed and displayed, for example, from a local store of display cues maintained in, for example, the customer system data store 105. In the server-based approach, the display cue may be selected, for example, from a remote datastore 124, 125 containing inter alia feedback cues. Thereafter, the display cue may be either transmitted independently to the customer or incorporated into a webpage or other suitably adapted data presentation for provision of substantially immediate feedback to the customer.

In one exemplary embodiment of the present invention, data communications paths 107, 127 further comprise data stream transmission methods that may include, for example: electronic; infrared; radio frequency; microwave frequency; optical; or any other I/O data stream method or protocol now known, or hereafter derived, by those skilled in the art. In yet a further alternative exemplary embodiment in accordance with the present invention, data storage means 104, 124 and CPU's 106, 126 may reside entirely or partially on a remote data processing system respectively, wherein communications paths 107, 127 embody I/O data paths utilizing, for example, any number of data traffic protocols, such as: TCP/IP; IPX/SPX; Bluetooth; Appletalk, IP-6, NetBIOS, OSI or any existing or future data traffic protocols now known or hereafter derived by those skilled in the art.

In another exemplary embodiment, server data storage means 124 may include any customer account data 125, for example: customer name; customer address; customer telephone number; account APR; account expiration; eligibility for incentive rewards; coupon codes; spending habits and/or the like.

In another exemplary embodiment, the system and method of providing visual feedback in a payment transaction according to the present invention includes a host server computer 120 or other computing systems including a processor 126 for processing digital data, at least one memory 128, 130 communicably coupled to said processor 126 for storing digital data, an input digitizer coupled to the processor for inputting digital data, an application program stored in at least one of said memories 128, 130 and accessible by said processor 126 for directing processing of digital data by said processor 126, a display coupled to the processor 126 and memory for displaying information derived from digital data processed by said processor 126 and a plurality of databases 124, said databases 124 including data 125 that could be used in association with the present invention.

The present invention may be described herein in terms of functional block components, optional selections and various processing steps. It should be appreciated that such functional blocks may be realized by any number of hardware and/or software components configured to perform the specified functions. For example, the present invention may employ various integrated circuit components, e.g., memory elements (i.e., 108, 110, 128, 130), processing elements (i.e., 106, 126), logic elements, matchable data structures, and the like, which may carry out a variety of functions under the control of one or more microprocessors (i.e., 106, 126) or other control devices. Similarly, the software elements of the present invention may be implemented with any programming or scripting language such as, for example: C; C++; Java; COBOL; assembler; Perl; XML; etc., or any programming or scripting language now known or hereafter derived by those skilled in the art, with the various algorithms being implemented with any combination of data structures, classes, class libraries, objects, processes, routines or other programming elements. Further, it should be noted that the present invention may employ any number of conventional techniques for data transmission, signaling, data processing, network control, and the like. Still further, the invention may optionally be configured to use a customer-side and/or server-side scripting language, such as Javascript®, Visual Basic Script® and/or the like. Additionally, the present invention may be adapted or otherwise suitably configured to use and/or process encrypted data traffic. For a basic introduction to cryptography, see the text by Bruce Schneier entitled "Applied Cryptography: Protocols, Algorithms, And Source Code In C," published by John Wiley & Sons (second edition, ©1996), which is hereby incorporated by reference.

It should be appreciated that the particular implementations of the present invention shown and described herein are illustrative of the invention and the inventor's conception of the best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The computing units (i.e., 102, 120, or various constituent components thereof) may be connected with each other via a data communication network 118. In one exemplary embodiment, the network 118 may be a public network and assumed to be insecure and open to eavesdroppers. In one representative implementation of the present invention, the network 118 may be embodied as the Internet. In this context, the computing devices 102, 120 may or may not be connected to the Internet at all times. Specific information related to data traffic protocols, standards, and application software utilized in connection with the Internet may be obtained, for example, from Dilip Naik, "Internet Standards and Protocols", ©1998; "Java 2 Complete", various authors, ©1999 Sybex; Deborah Ray and Eric Ray, "Mastering HTML 4.0", ©1997; Loshin, and "TCP/IP Clearly Explained", ©1997; all of these texts being incorporated herein by reference. A variety of conventional communications media and protocols may be used for data links, such as, for example: a connection to an Internet Service Provider (ISP) over the local loop, as is typically used in connection with standard modem communication; cable modems; Dish networks; ISDN; Digital Subscriber Line (DSL) or various wireless communication methods. Interactive feedback payment systems, in accordance with one exemplary aspect of the present invention, might also reside within a local area network (LAN), which interfaces to a network via, for example, a leased line (T1, T3, etc.). Such communication methods are generally well known in the art, and are covered in a variety of standard texts. See, i.e., Gilbert Held, "Understanding Data Communications", ©1996, hereby incorporated by reference.

Users may interact with the system via any input device such as: a keyboard; mouse; kiosk; personal digital assistant; Bluetooth appliance, handheld computer (e.g., Palm Pilot®); telephone; mobile phone and/or the like. Similarly, the invention could be used in conjunction with any type of personal computer, network computer, workstation, minicomputer, mainframe, and/or the like running any operating system such as: any version of Windows; Windows XP; Windows Whistler; Windows ME; Windows NT; Windows 2000; Windows 98; Windows 95; MacOS; OS/2; BeOS; Linux; UNIX or any operating system now known or hereafter derived by those skilled in the art. Moreover, the invention may be readily implemented with TCP/IP communications protocols, IPX, Bluetooth, Appletalk, IP-6, NetBIOS, OSI or any number of existing or future protocols.

Moreover, the system contemplates the use, sale and/or distribution of any goods, services or information having similar functionality described herein.

As will be appreciated by one skilled in the art, the present invention may be embodied as a method, a system, a device, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Data communication is accomplished through any suitable communication means, such as, for example: a telephone network; Intranet; Internet; point of interaction device (personal digital assistant, telephone, mobile phone, kiosk, etc.); online communications; off-line communications; wireless communications and/or the like. One skilled in the art will also appreciate that, for security reasons, any databases, systems, or components of the present invention may consist of any combination of databases or components at a single location or at multiple locations, wherein each database or system includes any of various suitable security features, such as: firewalls; access codes; encryption; decryption; compression; decompression and/or the like.

The present invention is described herein with reference to block diagrams and flowchart illustrations of methods, apparatuses (e.g., systems), and computer program products according to various exemplary aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or any other programmable data processing device to produce a machine, such that the instructions which execute on the computer or other programmable data processing device create means for implementing the functions specified in the flowchart block or blocks.

These computer program instructions may also be stored in a computer-readable memory that can direct a computer or other programmable data processing device to function in a particular manner, such that the instructions stored in the computer-readable memory produce an article of manufacture including instruction means which implement the function specified in the flowchart block or blocks. The computer program instructions may also be loaded onto a computer or other programmable data processing device to cause a series of operational steps to be performed on the computer or other programmable device to produce a computer-implemented process such that the instructions which execute on the computer or other programmable device provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

In the foregoing specification, the invention has been described with reference to specific embodiments. However, it will be appreciated that various modifications and changes can be made without departing from the scope of the present invention as set forth in the claims below. The specification and figures are to be regarded in an illustrative manner rather than a restrictive one, and all such modifications are intended to be included within the scope of the present invention. Accordingly, the scope of the invention should be determined by the appended claims and their legal equivalents, rather than by merely the examples given above. For example, the steps recited in any of the method or process claims may be executed in any order and are not limited to the order presented in the claims.

Benefits, other advantages, and solutions to problems have been described with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical". Other combinations and/or modifications of the above-described structures, arrangements, applications, proportions, elements, materials or components used in the practice of the present invention, in addition to those not specifically recited, may be varied or otherwise particularly adapted by those skilled in the art to specific environments, manufacturing or design parameters or other operating requirements without departing from the general principles of the same.

We claim:

1. A method for providing feedback in an interactive payment transaction, comprising the steps of:

receiving data substantially corresponding to a method of payment associated with a financial instrument;

analyzing said data to determine the type of associated financial instrument;

correlating said analyzed data with at least a suitably adapted cue corresponding to said financial instrument; and presenting said cue.

2. The method for providing feedback in an interactive payment transaction according to claim 1, wherein said received data is substantially correlated to at least one of a credit card account number, stored value account number and a charge account number.

3. The method for providing feedback in an interactive payment transaction according to claim 2, where said received data comprises biometric information.

4. The method for providing feedback in an interactive payment transaction according to claim 1, wherein said step of analyzing said received data further comprises parsing the data to determine at least one of a BIN number, a checksum, indicia of fraud, merchant product capabilities, member group, issuing locale, loyalty points and eligibility for promotions based on product type.

5. The method for providing feedback in an interactive payment transaction according to claim 1, wherein said cue is at least one of a visual cue, an audible cue, a tactile cue, a kinesthetic cue and an olfactory cue.

6. The method for providing feedback in an interactive payment transaction according to claim 5, wherein said visual cue is a graphic user interface cue.

7. The method for providing feedback in an interactive payment transaction according to claim 6, wherein said graphic user interface cue is an icon.

8. The method for providing feedback in an interactive payment transaction according to claim 7, wherein said presentation of said icon comprises display on at least one of a Bluetooth appliance, a wireless phone, a PDA, a smartcard, a smartcard reader, a transponder and a transponder reader.

9. The method for providing feedback in an interactive payment transaction according to claim 1, wherein said presentation of said cue is substantially concurrent with said reception of said data.

10. A method for providing feedback in an interactive payment transaction, comprising the steps of:
receiving data substantially corresponding to a method of payment associated with a financial instrument;
analyzing said data to determine the type of associated financial instrument;
correlating said analyzed data with at least a suitably adapted cue corresponding to said financial instrument; and
presenting said cue substantially concurrent with said reception of said data.

11. The method for providing feedback in an interactive payment transaction according to claim 10, wherein said received data is substantially correlated to at least one of a credit card account number, stored value account number and a charge account number.

12. The method for providing feedback in an interactive payment transaction according to claim 11, wherein said received data comprises biometric information.

13. The method for providing feedback in an interactive payment transaction according to claim 10, wherein said step of analyzing said received data further comprises parsing the data to determine at least one of a BIN number, a checksum, indicia of fraud, merchant product capabilities, member group, issuing locale, loyalty points and eligibility for promotions based on product type.

14. The method for providing feedback in an interactive payment transaction according to claim 10, wherein said cue is at least one of a visual cue, an audible cue, a tactile cue, a kinesthetic cue and an olfactory cue.

15. The method for providing feedback in an interactive payment transaction according to claim 14, wherein said visual cue is a graphic user interface cue.

16. The method for providing feedback in an interactive payment transaction according to claim 15, wherein said graphic user interface cue is an icon.

17. The method for providing feedback in an interactive payment transaction according to claim 16, wherein said presentation of said icon comprises display on at least one of a Bluetooth appliance, a wireless phone, a PDA, a smartcard, a smartcard reader, a transponder and a transponder reader.

18. A system for providing feedback in an interactive payment transaction, comprising:

means for receiving data substantially corresponding to a method of payment associated with a financial instrument;
means for analyzing said data to determine the type of financial instrument;
means for correlating said analyzed data to retrieve at least a suitably adapted cue corresponding to said financial instrument; and
means for presenting said cue.

19. The system for providing feedback in an interactive payment transaction according to claim 18, wherein the means for data entry comprise at least one of a monitor, a keyboard, a keypad, a Bluetooth appliance, a mouse, a stylus, a lightpen, a digitizing tablet, a touch screen, a biometric device, a smartcard, a smartcard reader, a transponder, a transponder reader and speech recognition.

20. The system for providing feedback in an interactive payment transaction according to claim 18, wherein said means for analyzing said received data comprises a data processor.

21. The system for providing feedback in an interactive payment transaction according to claim 20, wherein said data processor further comprises a multifunction CPU.

22. The system for providing feedback in an interactive payment transaction according to claim 18, wherein said means for analyzing received data comprises at least one suitably adapted datastore.

23. The system for providing feedback in an interactive payment transaction according to claim 18, wherein said means for correlating received data comprises at least one suitably adapted datastore.

24. The system for providing feedback in an interactive payment transaction according to claim 18, where said means for analyzing received data and said means for correlating said received data comprise a single, suitably adapted datastore.

25. The system for providing feedback in an interactive payment transaction according to any one of claims 22, wherein said datastore is at least one of an LDAP-compliant database, a relational database, a flat-file, an SQL-compliant database and an XML cache.

26. The system for providing feedback in an interactive payment transaction according to any one of claims 23, wherein said datastore is at least one of an LDAP-compliant database, a relational database, a flat-file, an SQL-compliant database and an XML cache.

27. The system for providing feedback in an interactive payment transaction according to any one of claims 24, wherein said datastore is at least one of an LDAP-compliant database, a relational database, a flat-file, an SQL-compliant database and an XML cache.

28. The system for providing feedback in an interactive payment transaction according to claim 18, wherein said presentation means include at least one of a monitor, a Bluetooth appliance, a wireless phone, a PDA, a smartcard, a smartcard reader, a transponder and a transponder reader.

29. A system for receiving feedback in an interactive payment transaction, comprising:
means for a payor to enter data corresponding to a method of payment associated with a financial instrument;
means for receiving said payor-entered data;
means for analyzing said data to determine the type of associated financial instrument;

means for correlating said analyzed data with at least a suitably adapted cue corresponding to said financial instrument; and means for presenting said cue to said payor.

30. The system for receiving feedback according to claim 29, wherein said means for presenting said cue to said payor further comprises means for presenting said cue substantially concurrent with said entry of said payor-entered data.

31. The system for receiving feedback according to claim 29, wherein said cue comprises at least one of a visual cue, an audible cue, a tactile cue, a kinesthetic cue and an olfactory cue.

32. A system for providing visual feedback in an interactive electronic payment transaction, comprising:

means for receiving customer data substantially corresponding to a financial instrument comprising at least one of a credit card account number, stored value account number and a charge account number;

means for analyzing said customer data to determine the type of financial instrument;

means for correlating said analyzed customer data to retrieve at least a suitably adapted visual cue corresponding to said financial instrument; and means for presenting said visual cue to the customer substantially concurrent with said reception of said customer data.

* * * * *